United States Patent
Lang et al.

(10) Patent No.: US 8,640,563 B2
(45) Date of Patent: Feb. 4, 2014

(54) RAM AIR TURBINE DEPLOYMENT ACTUATOR

(75) Inventors: David J. Lang, Rockford, IL (US); Gary Sasscer, Leaf River, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 262 days.

(21) Appl. No.: 13/115,209

(22) Filed: May 25, 2011

(65) Prior Publication Data

US 2012/0297924 A1 Nov. 29, 2012

(51) Int. Cl.
*F16H 1/24* (2006.01)

(52) U.S. Cl.
USPC .................. 74/89.39; 74/89.37; 74/89.38

(58) Field of Classification Search
USPC .................. 74/89.38, 89.39, 89.23, 89.37
See application file for complete search history.

(56) References Cited

U.S. PATENT DOCUMENTS

| | | | |
|---|---|---|---|
| 2,764,132 A | 9/1956 | Bakke | |
| 3,107,933 A | 10/1963 | Royster | |
| 3,469,871 A | 9/1969 | Betts | |
| 3,813,065 A | 5/1974 | Hallesy et al. | |
| 4,240,332 A | 12/1980 | Deutsch | |
| 4,267,775 A | 5/1981 | Sjotun et al. | |
| 4,392,556 A | 7/1983 | Deutsch | |
| 4,676,458 A | 6/1987 | Cohen | |
| 4,717,095 A | 1/1988 | Cohen et al. | |
| 4,740,122 A * | 4/1988 | Glaser | 409/232 |
| 4,742,976 A | 5/1988 | Cohen | |
| 4,863,323 A * | 9/1989 | Glaser | 409/232 |
| 4,991,796 A * | 2/1991 | Peters et al. | 244/58 |
| 5,366,313 A * | 11/1994 | LaBarre | 403/108 |
| 5,398,780 A | 3/1995 | Althof et al. | |
| 5,820,074 A | 10/1998 | Trommer et al. | |
| 6,238,292 B1 * | 5/2001 | Pelkey | 463/47.7 |
| 6,580,179 B2 * | 6/2003 | Eccles et al. | 290/44 |
| 6,832,540 B2 * | 12/2004 | Hart | 92/24 |
| 7,097,014 B2 * | 8/2006 | Huang | 188/300 |
| 7,100,465 B1 | 9/2006 | Hollis et al. | |
| 7,125,058 B2 * | 10/2006 | Hawthorne | 294/82.28 |
| 7,416,392 B2 * | 8/2008 | Russ | 416/142 |
| 7,610,828 B2 * | 11/2009 | Wingett et al. | 74/424.78 |
| 7,707,924 B2 * | 5/2010 | Yamanouchi et al. | 92/21 MR |
| 7,762,739 B2 * | 7/2010 | Blanchard | 403/322.2 |
| 8,042,417 B2 * | 10/2011 | Davies et al. | 74/89.39 |
| 8,251,606 B2 * | 8/2012 | Blanchard | 403/322.2 |
| 8,397,737 B2 * | 3/2013 | Evans et al. | 135/65 |
| 2007/0237640 A1 | 10/2007 | Russ | |

FOREIGN PATENT DOCUMENTS

WO 9419606 A1 9/1994

OTHER PUBLICATIONS

European Search Report for EP Application No. 12166240.7, Aug. 20, 2012.

* cited by examiner

*Primary Examiner* — David M Fenstermacher
(74) *Attorney, Agent, or Firm* — Carlson, Gaskey & Olds

(57) ABSTRACT

An actuator for a ram air turbine system includes a lock bolt having a multiple circumferentially arranged lateral supports. A piston rod supports multiple up-lock wedges. Multiple rollers are supported by the lateral supports with chamfers on the rollers engaging one another and are configured to radially support the up-lock wedges in a retracted position.

8 Claims, 5 Drawing Sheets

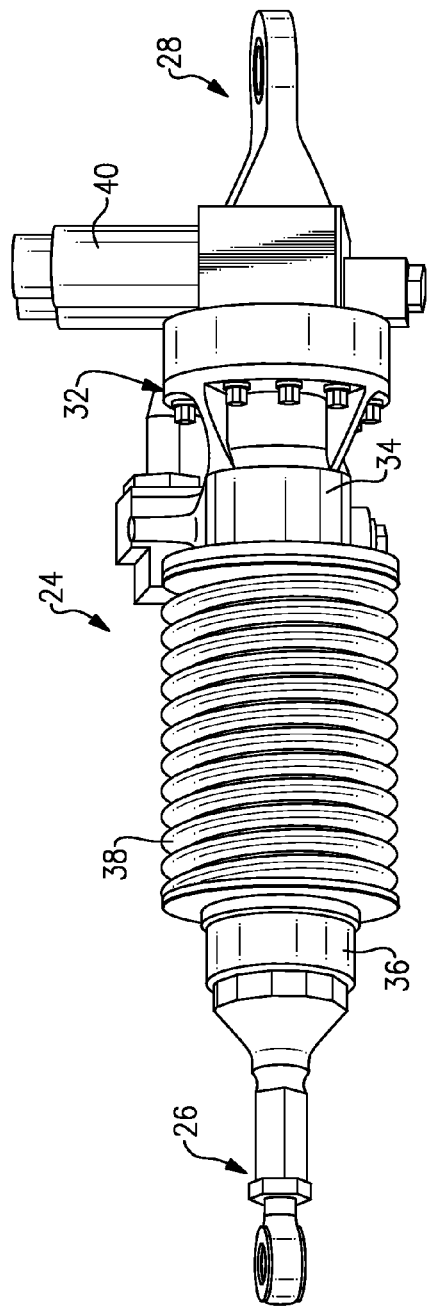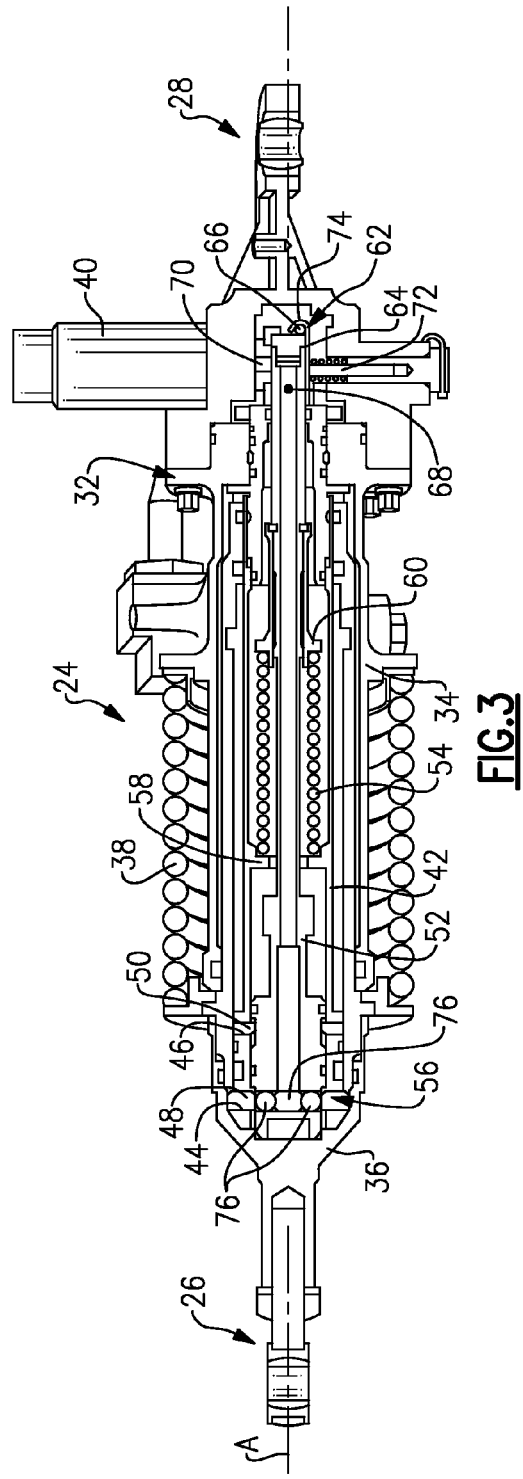

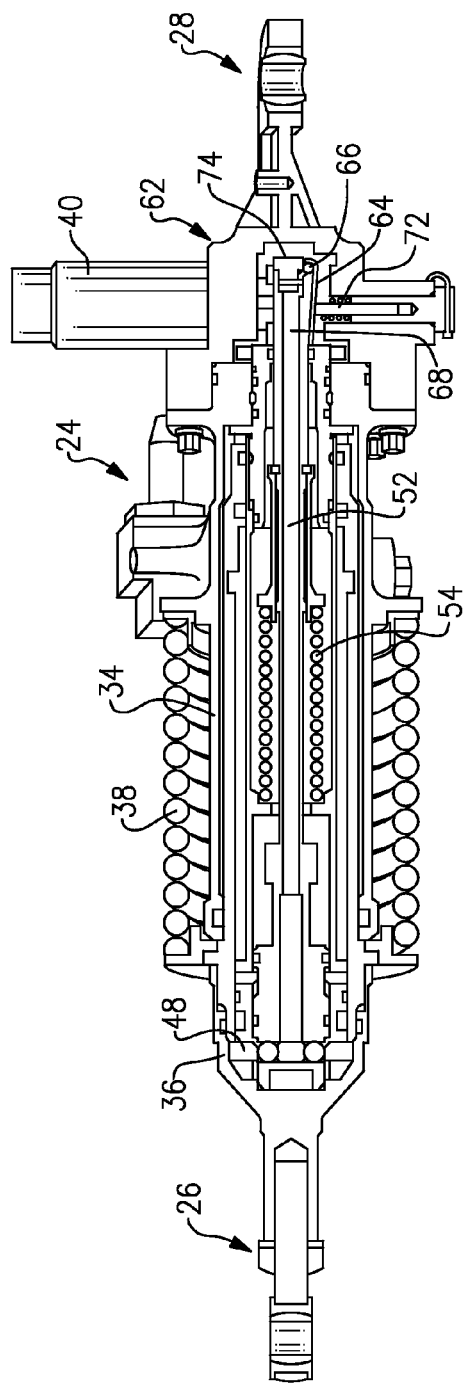
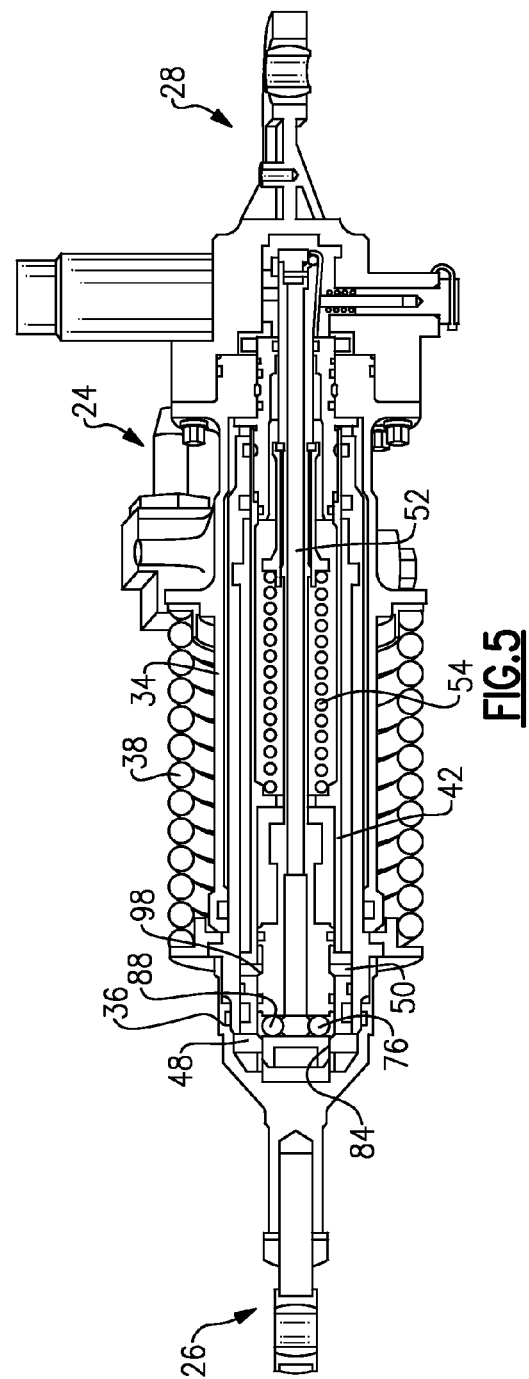
FIG.4A
FIG.5

RAM AIR TURBINE DEPLOYMENT ACTUATOR

BACKGROUND

This disclosure relates to a ram air turbine (RAT) deployment system, and more particularly, the disclosure relates to an actuator for the system.

Ram Air Turbines (RATs) are utilized on numerous aircraft to provide hydraulic and electrical power in emergency situations. The RAT is stowed in the aircraft structure and deployed into the air stream by a deployment actuator. The deployment actuator is attached to aircraft structure and to an arm on the strut of the RAT. On deployment, the deployment actuator forces the RAT to rotate out of its stowed, or retracted, position in the aircraft and into the air stream. The air stream acts on the RAT blades to spin the turbine and governor assembly, which in turn operates an electrical generator and hydraulic pump providing power to the aircraft. The RAT is held in the aircraft by an up-lock mechanism and is restrained in the deployed position by a down-lock mechanism, both of which are contained within the deployment actuator.

Typical up-lock and down-lock mechanisms utilize locking wedges, which restrain the actuator in either the stowed or deployed position. Deploying the actuator when only limited electrical power is available in emergency cases is challenging. The loads on the actuator in a deployment scenario can become relatively high due to aircraft flight conditions. These emergency conditions can generate high door loads when attempting to push the RAT into the air stream in-flight. Various wedge arrangements have been used to lock the actuator into position in numerous actuators. In one example, four up-lock wedges are released by sliding the lock bolt across an inner diameter of the wedges such that the wedges drop into a groove in the lock bolt that then releases the actuator to deploy the RAT.

In another example hydraulic locking actuator, rollers are used between two wedges to reduce the amount of force required to move the lock bolt to release the actuator. But, the load that can be applied to the actuator is limited.

SUMMARY OF THE INVENTION

An actuator for a ram air turbine system includes a lock bolt having a central support. A piston rod supports multiple up-lock wedges. Multiple rollers are supported in the lock bolt and are configured to radially support the up-lock wedges in a retracted position. The rollers include chamfers engaging one another.

BRIEF DESCRIPTION OF THE DRAWINGS

The disclosure can be further understood by reference to the following detailed description when considered in connection with the accompanying drawings wherein:

FIG. 2 is a perspective view of an actuator illustrated in FIG. 1 in a stowed or retracted position prior to deployment of the RAT.

FIG. 3 is a cross-sectional view of the actuator illustrated in FIG. 2.

FIG. 4A is a cross-sectional view of the actuator similar to FIG. 3, but with the lock bolt released by a latch assembly.

FIG. 5 is a cross-sectional view of the actuator with up-lock wedges released.

DETAILED DESCRIPTION

Figure 1:
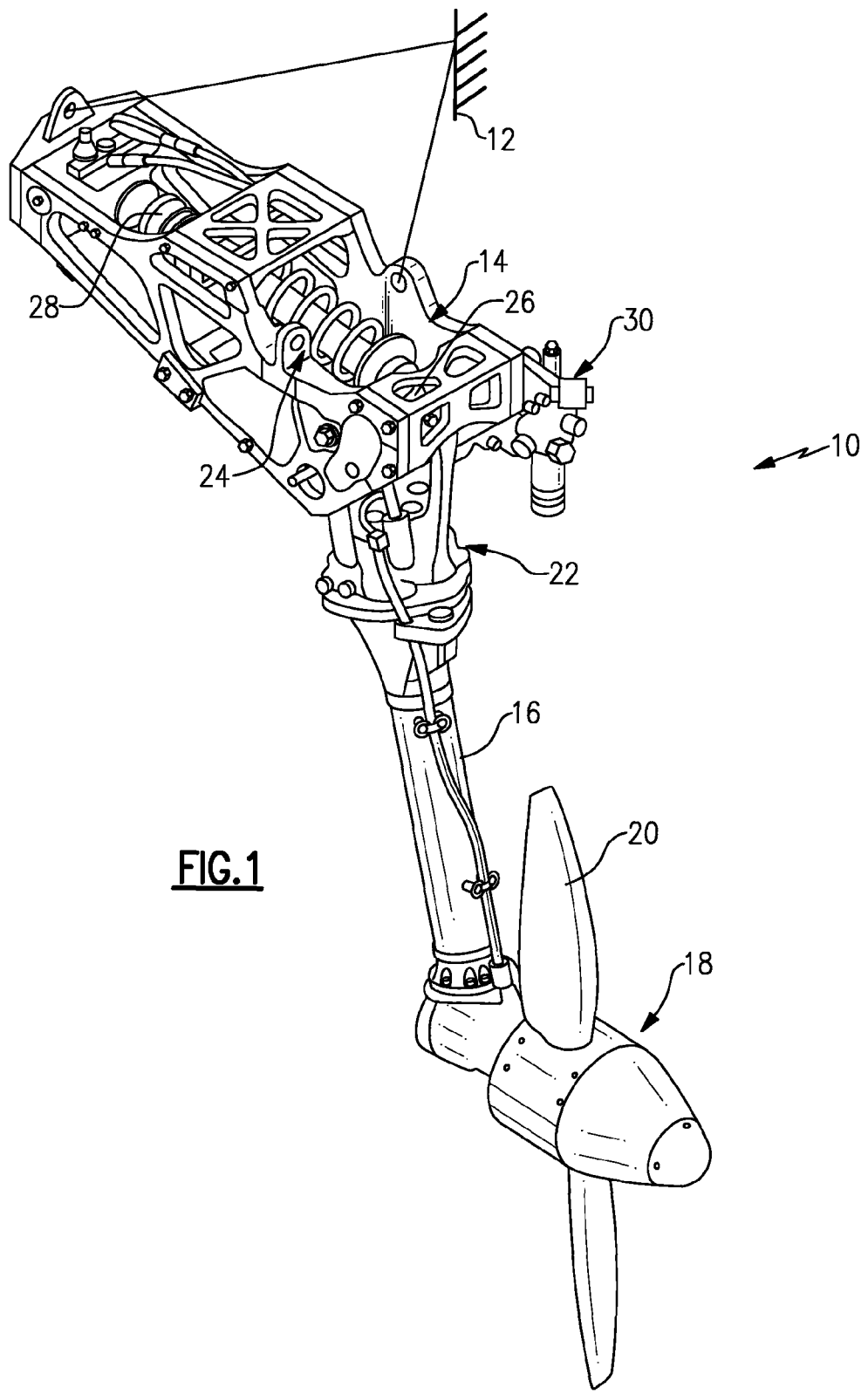
FIG. 1 is a perspective view of a RAT in a deployed position.

FIG. 1 illustrates a RAT system 10 secured to an aircraft structure 12 by a housing 14. The housing 14 pivotally supports a strut 16 having a turbine 18 at one end. The turbine 18 includes blades 20, which impart rotational drive to a generator 22 and a hydraulic pump 30. An actuator 24 is secured to the strut 16 at a first end 26 and to the housing at a second end 28. The actuator 24 is illustrated in its deployed position.

Referring to FIGS. 2 and 3, the actuator 24 includes a housing 32 having first cylinder 34 and second separate cylinder 36, unattached to housing 32, telescopically arranged relative to one another. A deploy spring 38 is arranged between the first and second cylinders 34, 36 in a compressed state with the actuator 24 in its retracted position. A deploy solenoid 40 is mounted on the housing 32 and is actuated to initiate a deploy sequence within the actuator 24.

The second cylinder 36 is received within the first cylinder 34. A piston rod 42 is affixed to the housing 32 such that it is rigidly attached to the first cylinder 34, such that the second cylinder 36 slides between and relative to the piston rod 42 and the first cylinder 34. The piston rod 42 includes first and second apertures 44, 46, which respectively receive up-lock and down-lock wedges 48, 50. A lock bolt 52 is arranged slideably within the piston rod 42 to actuate the up-lock and down-lock wedges 48, 50 during the deploy sequence. The piston rod 42 includes a flange 58 and a collar 60 spaced apart from one another. A lock bolt spring 54 is provided between and engages the flange 58 and collar 60 to bias the piston rod 42 and lock bolt 52 apart along the axis A. A roller assembly 56 is supported by the lock bolt 52 and arranged radially between the lock bolt 52 and the up-lock wedges 48.

A latch assembly 62 is provided in the housing 32 near the deploy solenoid 40. A lever 64 is pivotally supported by a pivot 68 at one end, and the lever 64 includes a latch pin 66 opposite the pivot 68. A biasing member 72 maintains the lever 64 in a normally retracted position. The latch pin 66 engages an end 74 of the lock bolt 52 in the retracted position. A rod 70 extending from the deploy solenoid 40 cooperates with the lever 64 to move the lever 64 from a retracted position (FIG. 3) to a deployed position (FIG. 4A).

In operation, to initiate a deploy sequence, the deploy solenoid 40 moves the rod 70 to rotate the lever 64 about the pivot 68, which disengages the latch pin 66 from the end 74, overcoming the biasing force from lock bolt spring 54. With the latch pin 66 disengaged from the end 74, the lock bolt 52 is forced to move axially (to the right in FIG. 4A) in response to the biasing force from lock bolt spring 54.

Figure 4B:
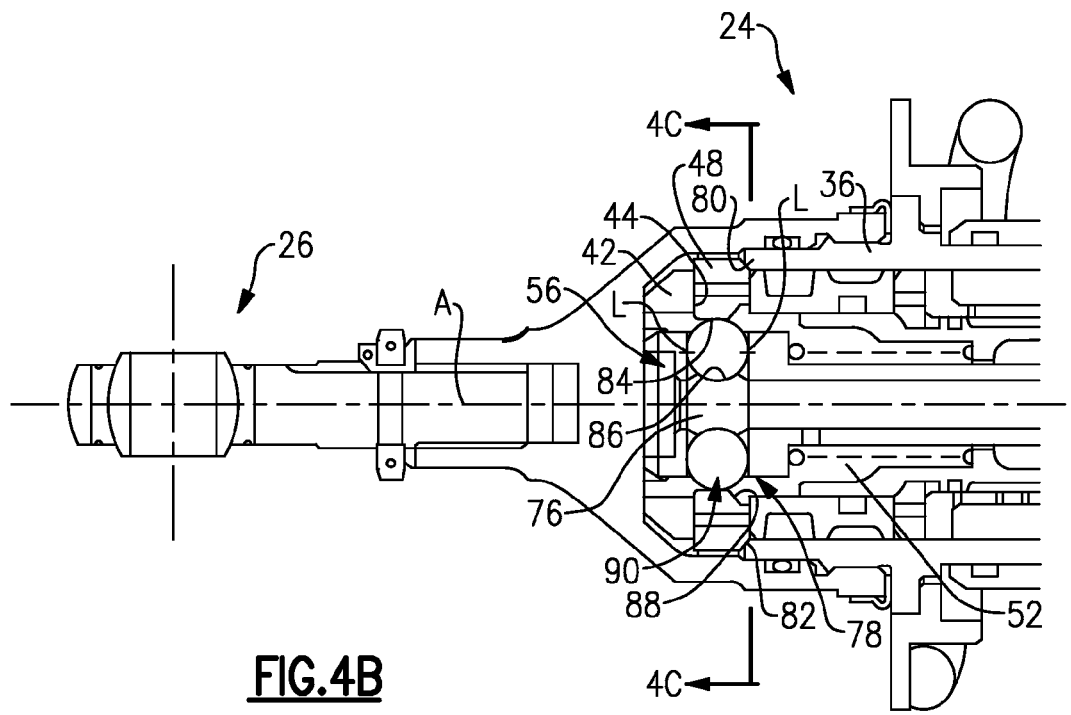
FIG. 4B is an enlarged view of the actuator illustrated in FIG. 4A.
Figure 4C:
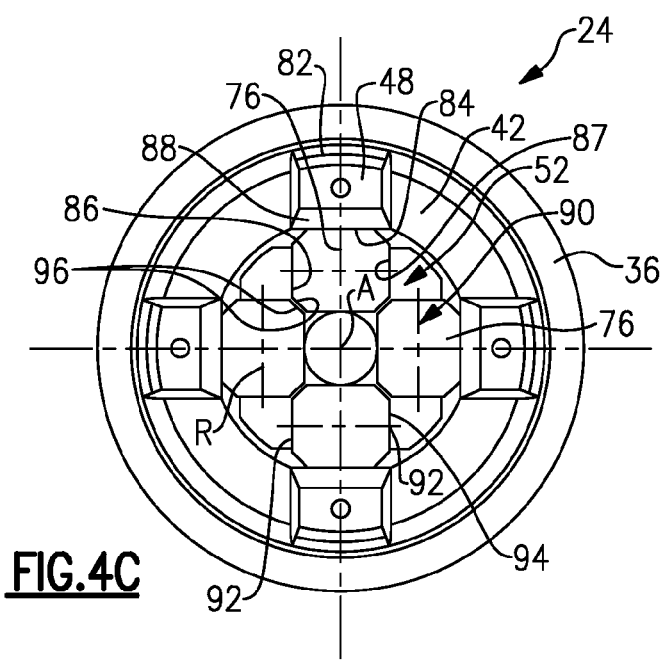
FIG. 4C is a cross-sectional view of the actuator along line 4C-4C in FIG. 4B.

Referring to FIGS. 4A-4C, movement of the roller assembly 56 (to the right in the Figures) permits the up-lock wedges 48 to move radially inward and disengage from the cylinders 36 thereby enabling the second cylinder 36 to move axially away from the first cylinder 34. The roller assembly 56, as illustrated in FIGS. 4A-4C, is depicted in the retracted position. The roller assembly 56 includes rollers 76 supported by a lateral support 78 of the lock bolt 52. The rollers 76 are provided in slots 90 evenly spaced circumferentially in the lock bolt 52. The lateral support 78 includes two flat surfaces 86 and 87, provided by each slot 90, that support the rollers 76. The slots in the slots 90 offer line contact L with the rollers 76, retaining them axially. This line contact is the only friction the rollers experience with respect to the lock bolt 52 allowing a smaller lock bolt spring 54. The flat surfaces 86 and 87 are perpendicular to axis A of the actuator. The lock bolt 52, used to space the rollers 76 evenly about the circumference of the lock bolt and in a plane perpendicular to the axis A, retains four rollers 76 axially. The rollers 76 are supported radially by their own corner chamfers 96 which rest against one another. The four rollers radially support four up-lock wedges 48 in the same plane which are retained axially by piston rod 42.

The second cylinder 36 includes a beveled surface 80. The up-lock wedges 48 include a first angled surface 82 that engages the beveled surfaces 80. The rollers 76 support an inner surface 84 of the up-lock wedges 48. A second angled surface 88 is provided on the up-lock wedges 48 near the rollers 76 opposite the first angled surface 82.

Each roller 76 includes ends 92 opposite one another that provide a clearance 94 between the rollers 76 and the slots 90 to enable axial movement of the roller 76 along a roller axis R. Each roller 76 includes chamfers 96 at either end 92. The chamfers 96 of the rollers 76 engage one another with the provided clearance 94 to accommodate misalignment with the components and support the roller loading due to reacting the up-lock wedge 48 loads developed from the contact of surfaces 80 and 82. For the example arrangement, in which four rollers are used, the chamfers are at a 45° angle relative to the cylindrical roller bearing surface of the rollers 76. In this manner, the loads amongst the rollers 76 are shared between the mating chamfers 96 and the frictional loads are reduced due to the rolling contact between the roller chamfers 96. Thus, the loads on the up-lock wedges 48 are more evenly distributed, which enables a higher capacity actuator with reduced release force. It should be understood that the number of wedges and the number of rollers may vary for other actuator applications depending on the loads.

Figure 6:
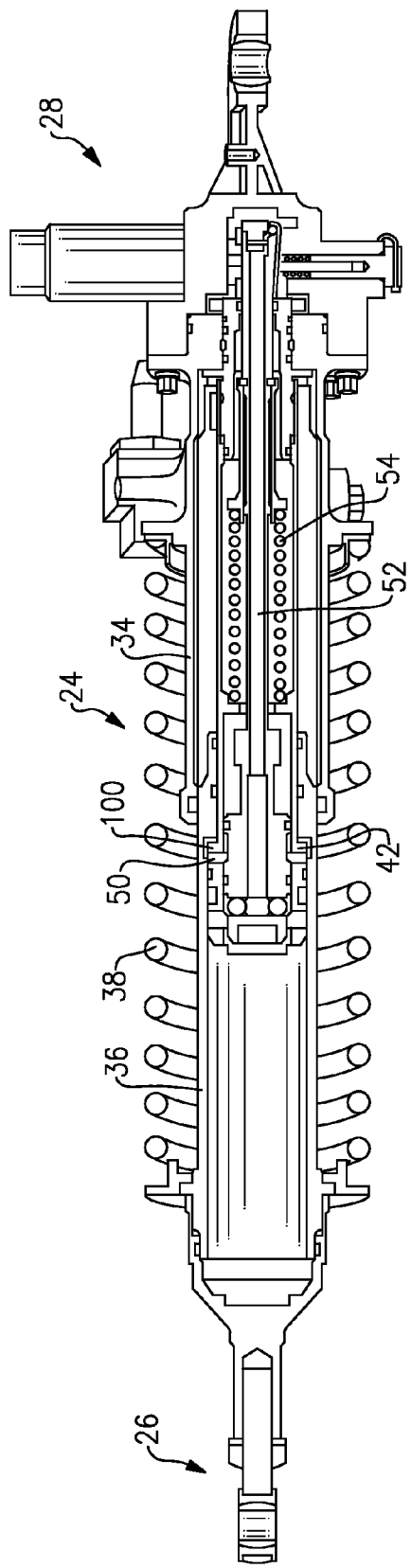
FIG. 6 is a cross-sectional view of the actuator in a fully deployed position.
Figure 7:
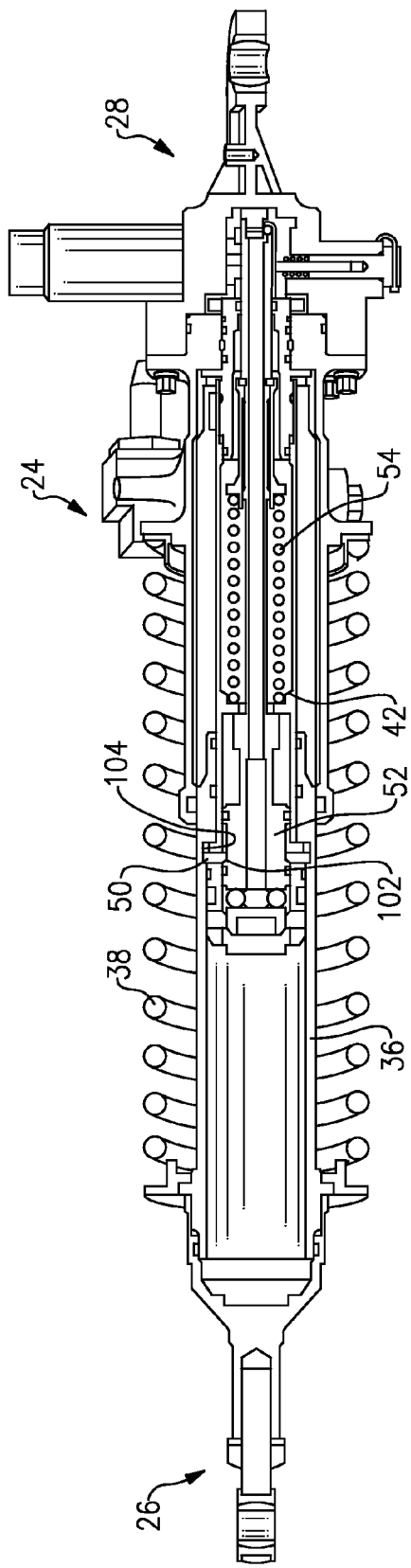
FIG. 7 is a cross-sectional view of the actuator in a fully deployed position with the down-lock wedges engaged.

Referring to FIGS. 5-7, the lock bolt spring 54 continues to move the lock bolt 52 (to the right in the Figures), enabled by the roller assembly 56 sliding relatively easily within the piston rod 42. Once the rollers 76 have moved out of engagement with the inner surface 84 of the up-lock wedges 48, the beveled surface 80 forces the up-lock wedges 48 radially inwardly in response to the force of the deploy spring 38, as illustrated in FIG. 5. The lock bolt 52 moves axially relative to the piston rod 42 until a stop 98 engages the down-lock wedges 50.

The second cylinder 36 continues to move axially outwardly relative to the first cylinder 34 until a stop 100 on the piston rod 42 engages a surface on the second cylinder 36, limiting its axial position relative to the first cylinder 34 (FIG. 6). The lock bolt 52 continues to move axially to the right in response to the force from the lock bolt spring 54 applied to a beveled surface 102 of the lock bolt 52 forces the down-lock wedges 50 radially outward into a groove 104 of the second cylinder 36.

Although an example embodiment has been disclosed, a worker of ordinary skill in this art would recognize that certain modifications would come within the scope of the claims. For that reason, the following claims should be studied to determine their true scope and content.

What is claimed is:

1. An actuator for a ram air turbine system comprising:
   a lock bolt providing multiple circumferentially arranged lateral supports;
   a piston rod supporting multiple up-lock wedges; and
   multiple rollers, each of which are supported between the lateral supports and configured to radially support the up-lock wedges in a retracted position, the rollers including chamfers engaging one another.

2. The actuator according to claim 1, wherein the lock bolt includes slots providing the lateral supports, and the rollers arranged in the slots.

3. The actuator according to claim 2, comprising a clearance between each roller and its corresponding slot to permit an axial movement of each roller along an axis of the lock bolt and within its respective slot.

4. The actuator according to claim 3, wherein the lateral supports and the rollers are configured to share a load between all the up-lock wedges, each roller movable along a roller axis and along the axis to shared the load.

5. The actuator according to claim 3, wherein each roller includes opposing ends each having the chamfer.

6. The actuator according to claim 5, wherein the multiple rollers are provided by four rollers having a 45° chamfer at the opposing ends.

7. The actuator according to claim 1, comprising first and second cylinders telescopically arranged relative to one another and configured to be biased axially away from one another by a deploy spring, the piston rod and lock bolt arranged within the second cylinder.

8. The actuator according to claim 1, comprising a latch assembly cooperating with the lock bolt and configured to move between retracted and deployed positions, and a lock bolt spring configured to bias the piston rod and lock bolt away from one another with the latch assembly in the deployed position.

* * * * *